April 4, 1961   L. OESTEREICHER   2,977,838
SQUARE-RECESSED SCREWS AND PUNCH MEANS FOR MAKING SAME
Filed Sept. 20, 1957
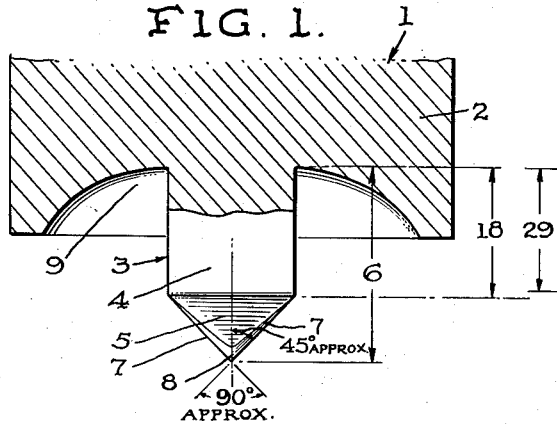
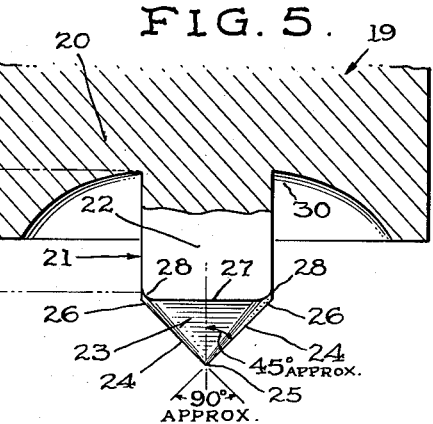
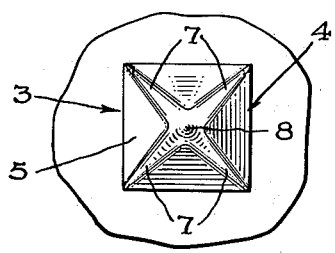
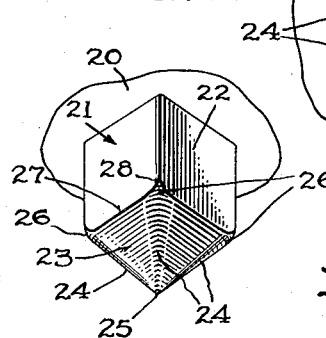
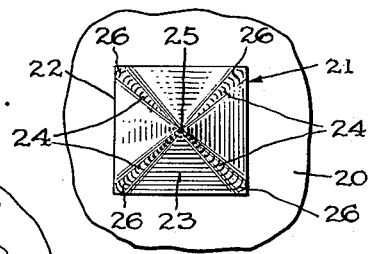
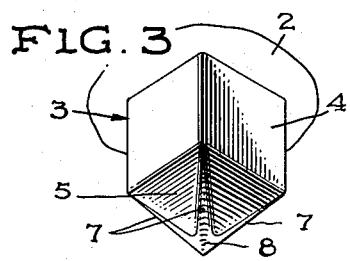
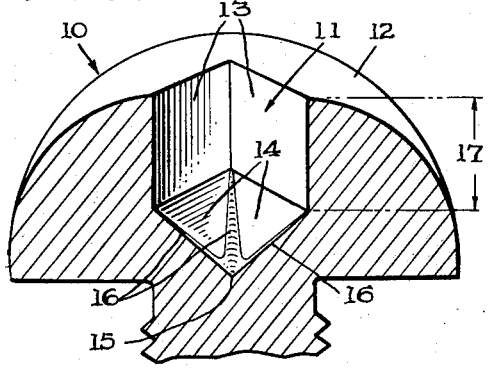
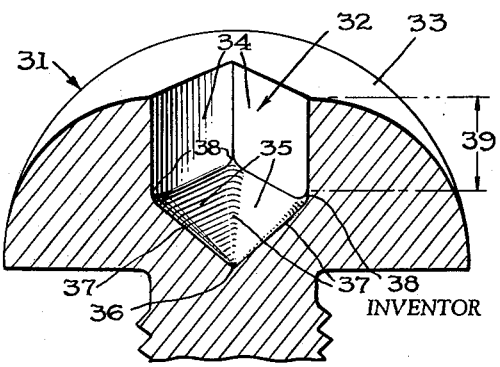
INVENTOR
LOUIS OESTEREICHER
BY
ATTORNEYS

United States Patent Office 2,977,838
Patented Apr. 4, 1961

2,977,838

SQUARE-RECESSED SCREWS AND PUNCH MEANS FOR MAKING SAME

Louis Oestereicher, Teaneck, N.J., assignor to General American Transportation Corporation, Chicago, Ill., a corporation of New York Filed Sept. 20, 1957, Ser. No. 685,186

8 Claims. (Cl. 85—45)

The present invention relates to new and useful improvements in fasteners, and more particularly in an improved recess or socket formed in the end of a fastener such as a screw, bolt or the like, and in punch means for making such recesses.

Among the various forms of recesses heretofore provided in the driving ends of such fasteners is the common square socket type of recess such as that disclosed in Patent No. 1,003,657, issued September 19, 1911, to P. L. Robertson. The Robertson type of recessed screw and punch means for making same have been utilized for many years, particularly in Canada, despite the serious problems involved in manufacturing such screws as the result of using a square sharp-edge pyramidal pointed punch to form the driving recess or socket.

The most outstanding defect that is prevalent in the above-mentioned Robertson-type of screw is its tendency to embody weakened, fractured or split corner areas which develop at the outer corner portion of the recess due to crystallization, contrary to the recitation in said patent, as a result of using the very sharp-edged pyramidal pointed punch described therein. Because of this, a second refinishing process has frequently been found necessary in order to remove the visible fractured areas on the driving end or screw head.

A further characteristic and inherent drawback to screws of this type is that said screws cannot be annealed, as by heat treating, as required in certain cases such as in self-tapping screws due to the fact that heat treatment serves only to intensify the corner weaknesses or fractures aforesaid, and thus making them unfit for practical use.

Although the manufacturers of Robertson-type screws have come to recognize these deficiencies and have sought to rectify them by various modifications of their punches, many of the screws and punches therefore are still defective, very short-lived, or otherwise unsatisfactory.

Accordingly, it is a principal object of this invention to provide a fastener of this general type having a recessed or socketed internal configuration of the so-called square-type formed in at least one end thereof and punch means for making the same which obviates the foregoing shortcomings.

Another object of the present invention is to provide an improved fastener of the socketed or recess head type which overcomes all of the above-mentioned disadvantages while still assuring the optimum driver purchase by maintaining a normal over-all depth of the recess without extending it into the shank of the fastener.

A further object is to provide an improved screw and punch means for making the same which have better practical utility and greater useful working longevity.

The aforementioned objects of this invention are accomplished by using my improved punch means which are characterized by having a generally square shank and pyramidal type of penetrating point or tip, but instead of the tip being sharp at the pyramidal corners, in one form, the tip corners are rounded off, with the rounded surface at each corner tapering from zero at the extreme pyramidal point and progressively increasing laterally to the pyramidal base shoulder on the shank portion, and in another form the rounded corners of the tip progressively increase in lateral extent starting from zero at the base of the pyramidal tip, continuing to the extreme end of the tip.

The use of punches of this type assures a more uniform distribution of metal strain and a less abrupt metal flow during punching operations and causes no tendency to fracture the screwhead in any manner, even when heat treated.

Other objects and advantages will become apparent from the following detailed description and accompanying drawing and the novel features thereof defined in the appended claims.

In the drawing:

Fig. 1 is a side elevational view illustrative of one form of my novel punch, with a portion of the punch body shown in cross-section;

Fig. 2 is a bottom plan view of the punch of Fig. 1, showing the improved pyramidal point;

Fig. 3 is a perspective view of the punch of Figs. 1 and 2 as seen from below;

Fig. 4 is a fragmentary cross-sectional perspective view of the head portion of a screw as recessed or socketed by the punch of Figs. 1–3.

Fig. 5 is a side elevational view illustrative of a modified form of punch, with a part of the body thereof shown in cross-section;

Fig. 6 is a bottom plan view of the punch of Fig. 5;

Fig. 7 is a perspective view of the punch of Figs. 5 and 6 as seen from below; and Fig. 8 is a fragmentary cross-sectional perspective view of the head portion of a screw as recessed or socketed by the modified form of punch of Figs. 5–7.

Referring to Figs. 1–3 of the drawing, like reference numbers refer to corresponding parts throughout the several views, wherein 1 generally designates one illustrative form of my improved punch means, comprising a main body portion 2 having a projecting punch die generally designated at 3 and formed at the free end thereof. The punch may be formed with projecting dies at both ends and thereby be reversible if desired. The punch die 3 comprises a generally square elongated shank 4 composed of a plurality of flat intersecting sides disposed substantially parallel to the axis of the punch body, said sides respectively terminating in a generally pyramidal point 5 having its opposed faces intersecting at an angle of substantially 90° at the apex of the point, or respectively disposed at an angle of substantially 45° relative to the central axis thereof.

By providing my punches with penetrating points composed of multiple inclined flat faces, each respectively converging at an angle of substantially 45° relative to the central axis and having rounded corners at the intersections of adjacent faces as will be described hereinafter, it assures more uniform distribution of metal strain and less abrupt metal flow than punches having points converging at an angle of substantially greater than 45° relative to the central axis and/or those having sharply formed corners at the intersection of converging tip faces, thereby eliminating undesirable results such as crystallization and fracturing of the screw in the zone of the recess or socket formed by the punch.

The over-all length 6 of the punch die 3 is preferably limited proportionately to the head thickness of the particular number or size of screw on which it is to be used so as not to exceed the approximate thickness of said screw head, and thus when forming the recess therein, the die will not penetrate beyond the thickness of the screw head into the screw shank and tend to weaken the screw at the junction of the head and the screw shank.

The generally pyramidal shaped point 5 is formed so that the corners defined by adjacent intersecting flat faces have their normally sharp edges rounded off in a manner wherein the respective rounded corners 7 progressively diverge laterally from substantially zero at the pyramidal base or shoulder of the shank 4 to the tip of the pyramidal point, forming conical surfaces at each of the corners 7 and forming substantially a full cone at the apex of the point as at 8.

The body member 2 of this particular illustrative form is preferably provided with an annular concave recess 9 adjacent the base of the shank 4 as seen in Fig. 1 where the particular punch is intended for use on round or oval headed type screws. The recess 9 is used to prevent deforming of the screw head adjacent the recessed area during punching operations.

In Fig. 4, their is illustrated the upper portion of a screw fastener 10 having a socket or recess as formed by the punch of Figs. 1–3, showing a square axially extended driving recess 11 within the head 12 in perspective central cross-section through the diagonal corners thereof. The recess 11 is of a form complemental to the form of punch being used and in this instance, complemental to the above-described punch die 3, said recess having a plurality of intersecting flat driving faces 13 disposed substantially parallel to the central axis of the fastener. At the inner end of the recess 11, said flat faces 13 are inclined as at 14 at an angle of substantially 45° relative to the central axis of the fastener and intersect on planes corresponding to the respective planes of intersection of said driving faces 13 and terminate at a point 15 on the central axis of the fastener. The corners of the intersecting inclined faces 14 are rounded, as at 16, complementary to the rounded corners 7 of the punch.

It therefore becomes apparent that optimum screw head strength and optimum screw driver "purchase" or driving depth within the head 12, which is denoted at 17 of Fig. 4 and corresponds to that denoted at 18 in Fig. 1, is attained by use of my novel punch.

In Figs. 5–7, there is illustrated a modified form of punch wherein 19 designates the punch generally, said punch comprising a main body portion 20 having a projection punch die designated generally at 21 and formed at one end thereof. This modified form of punch may also be made reversible if desired by providing dies at both ends of the body 20.

The punch die 21 comprises an elongated shank 22 which is illustrated as being generally square in cross-section and having the outward free end thereof terminating in a generally pyramidal point 23, being of similar construction as the embodiment illustrated in Figs. 1–3, excepting for the modified form of pyramidal point 23 which will be more specifically described hereinafter. The inclined flat faces comprising the pyramidal end or point 23 are convergingly disposed at an angle of substantially 45° relative to the central axis of the shank and meet in an apex 25 at a point thereon.

The pyramidal end 23 of this modified embodiment is formed so that the corner edges of the intersecting adjacent faces have their normally sharp edges rounded off as at 24 in a manner wherein the respective rounded corners progressively diverge laterally from substantially zero at the apex 25 of the pyramidal point 23 to each of the corners 26 of the pyramidal base 27 or shoulder of the shank 22, as best seen in Figs. 6 and 7.

It is to be understood that in this embodiment, the extent of the laterally diverged rounding of the corners at the pyramidal base corners 26 of the tip 23 should be preferbaly limited so as not to exceed the approximate illustrated proportions, thereby avoiding a rounded shoulder area down the shank 22 in excess of that shown at 28 in Figs. 5 and 7. By so restricting the rounded corners 26 preferably to the approximate illustrative proportions and purposely and intentionally avoiding rounded corners approaching a nearly conical or fully conical point, optimum driver purchase depth within the screw end is thereby attained in screws madeby these punches. This purchase-forming length of the punch die is indicated at 29 in Fig. 5 and can be readily seen to be only an inappreciable amount less than the optimum purchase length 18 of the embodiment of Fig. 1.

The body member 20 of this punch embodiment may also be provided with an annular concave recess as at 30 adjacent the base of shank 22 as seen in Fig. 5 where the particular punch is intended for use on round or oval head type screws, and for the same purpose as described hereinabove for the first embodiment.

In Fig. 8, there is illustrated the upper portion of a screw 31 having a recess or socket formed by the modified punch of Figs. 5–7, showing the square recess 32 within the head 33 in perspective central cross-section through the diagonal corners thereof. The recess 32 is of a form complemental to the above-described punch die 21, and much the same as the recess 11 of the screw embodiment of Fig. 4, with the exception of the rounded corners at the inner pyramidal end of the recess. More specifically, the recess 32 is composed of a plurality of intersecting flat driving faces 34 disposed substantially parallel to the central axis of the fastener, with the inner ends of the respective flat faces extended and inclined towards each other as at 35 and intersecting in planes corresponding to the respective planes of intersection of said driving faces and terminating at a point 36 on the central axis of the fastener. The corners of the intersecting inclined faces 35 are rounded to progressively converge laterally as at 37 from the corners 38, which are formed complementally by the rounded shoulders 28 of the punch, to the bottom 36 of the recess 32.

It is readily apparent that by employing my novel punches 1 and 20 constructed in the manner described, optimum driver purchase designated at 17 and 39 respectively in the screw heads, along with optimum screw head strength is attained; the optimum strength being the result of using a punch having penetrating tip faces disposed at an angle of substantially 45° relative to the central axis and having rounded corners as hereinbefore described, thus assuring more uniform distribution of metal strain and less abrupt metal flow than prior art punches, and thereby producing a superior recessed-head fastener product without any tendency of fractures or crystallization resulting, even when annealed by heat treating.

While the sides of the punch shanks have been illustrated as being of substantially equal transverse dimension to form a substantially square recess, it is understood that the expression "square recess" or "square socket" is intended to be interpreted in the broad sense to indicate any generally rectangular recess. The sides of the shanks may be tapered a very slight amount toward the pyramidal point to facilitate easier withdrawal of the punch dies from the work material.

It is to be further understood that the punches of this invention can be made in various forms, such as with the body having only flat shouldered areas adjacent the base of the shank of the punch die for recessing screw heads of the flat end or flat head type; or the punch body may be of a form having a more accentuated annular recess adjacent the shank of the punch die so as to be suitable for concurrently forming the final shape of a rounded type screw head on a blank while forming the recess or socket therein. Still other punch die forms can also be utilized so as to form hexagonal and other recesses having various internal configurations as long as the inclined tip faces are disposed at an angle of substantially 45° relative to the central axis of the fastener.

While the specific details have been herein shown and described, the invention is not confined thereto as various changes and alterations may be made without departing from the spirit and scope thereof as defined in the appended claims.

I claim:

1. A screw-threaded fastener having an axially extended driving recess formed in one end thereof by punching with a single blow at room temperature, the major and outermost portion of said recess being defined by a plurality of flat driving faces respectively disposed substantially parallel to the central axis of the fastener and intersecting at substantially right angularly defined corners, said faces being axially extended in converging fashion beyond the said major portion to define a point at the innermost end of the recess, the degree of convergence of the respective faces to the central axis of the fastener being substantially 45 degrees and the corners of the intersecting flat faces being rounded only on the converging portions thereof.

2. A screw-threaded fastener as defined in claim 1, wherein the major portion of the axially extended recess thereof is substantially square and the inner converging end of the recess is of an inverted pyramidal form.

3. A screw-threaded fastener as defined in claim 1, wherein the rounded corner areas of the converging portion of the faces each progressively diverge laterally from the initiation of convergence to the innermost end of the recess.

4. A screw-threaded fastener as defined in claim 1, wherein the rounded corner areas of the converging portion of the faces each progressively diverge laterally from the innermost end of the recess to the initiation of convergence.

5. A punch for forming recesses in screw threaded fasteners by punching with a single blow at room temperature, characterized by an axially elongated major shank portion having a plurality of flat driving faces respectively disposed substantially parallel to the central axis of the punch and intersecting at substantially right angularly defined corners, said faces being axially extended in converging fashion beyond the said major shank portion to define a point at the extreme outer end thereof, the degree of convergence of the respective faces to the central axis of the punch being substantially 45 degrees and the corners of the intersecting faces being rounded only on the converging portions thereof.

6. A punch as defined in claim 5, wherein the shank of the punch is substantially square in transverse cross-section and the converging end thereof being pyramidal in form.

7. A punch as defined in claim 5, wherein the rounded corner areas of the converging portion of the faces progressively diverge laterally from the initiation of convergence to the point.

8. A punch as defined in claim 5, wherein the rounded corner areas of the converging portion of the faces progressively diverge laterally from the point to the initiation of convergence.

References Cited in the file of this patent

UNITED STATES PATENTS

| | | |
|---|---|---|
| 1,003,657 | Robertson | Sept. 19, 1911 |
| 1,771,610 | Blakeslee | July 29, 1930 |
| 1,978,371 | Purtell | Oct. 23, 1934 |
| 2,206,085 | Fieg | July 2, 1940 |
| 2,216,382 | West | Oct. 1, 1940 |
| 2,397,216 | Stellin | Mar. 26, 1946 |
| 2,673,359 | Stellin | Mar. 30, 1954 |
| 2,804,894 | Rosenburg | Sept. 3, 1957 |

FOREIGN PATENTS

| | | |
|---|---|---|
| 9,980 | Great Britain | May 7, 1908 |